United States Patent
Kratzer

(10) Patent No.: US 8,500,086 B2
(45) Date of Patent: Aug. 6, 2013

(54) SOLENOID VALVE

(75) Inventor: Dietmar Kratzer, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 153 days.

(21) Appl. No.: 12/742,225

(22) PCT Filed: Sep. 24, 2008

(86) PCT No.: PCT/EP2008/062721
§ 371 (c)(1),
(2), (4) Date: May 10, 2010

(87) PCT Pub. No.: WO2009/059847
PCT Pub. Date: May 14, 2009

(65) Prior Publication Data
US 2010/0264340 A1 Oct. 21, 2010

(30) Foreign Application Priority Data
Nov. 8, 2007 (DE) .......................... 10 2007 053 300

(51) Int. Cl.
*F16K 31/02* (2006.01)

(52) U.S. Cl.
USPC ............... 251/129.02; 251/129.15; 303/119.2

(58) Field of Classification Search
USPC ............ 251/129.02, 129.15, 337; 303/119.1, 303/199.2
See application file for complete search history.

(56) References Cited

U.S. PATENT DOCUMENTS

| 5,603,483 | A | * | 2/1997 | Reuter et al. ............. 251/129.02 |
| 5,975,654 | A | * | 11/1999 | Zaviska et al. ........... 137/599.16 |
| 6,084,493 | A | | 7/2000 | Siegel |
| 6,644,623 | B1 | | 11/2003 | Voss et al. |
| 7,273,206 | B2 | * | 9/2007 | Sato et al. ................ 251/129.15 |
| 2005/0173979 | A1 | * | 8/2005 | Voss .......................... 303/119.2 |
| 2008/0203343 | A1 | | 8/2008 | Kratzer |

FOREIGN PATENT DOCUMENTS

| DE | 10117610 A1 | 7/2002 |
| DE | 102005044672 A1 | 3/2007 |
| JP | 2005132347 A | 5/2005 |
| WO | 9840258 A1 | 9/1998 |
| WO | 0100473 A1 | 1/2001 |
| WO | 0130626 A1 | 5/2001 |

* cited by examiner

*Primary Examiner* — Eric Keasel
*Assistant Examiner* — Seth Faulb
(74) *Attorney, Agent, or Firm* — Maginot, Moore & Beck

(57) ABSTRACT

A solenoid valve having a magnet assembly and a valve cartridge includes a capsule and a valve insert connected to the capsule. An armature, that is movably disposed within the capsule, includes a tappet having a locking element and a main sealing element. A valve body having a main valve seat is pressed into the valve insert, wherein a magnetic force generated by the magnet assembly axially moves the armature against the force of a return spring and plunges the main sealing element into the main valve seat in a sealing manner. The valve body includes an open end which acts as a spring support for the return spring, wherein the return spring is disposed outside of a fluid flow path present between the opened main valve seat and at least one radial downstream opening in the valve body.

19 Claims, 3 Drawing Sheets

PRIOR ART

US 8,500,086 B2

SOLENOID VALVE

CROSS-REFERENCE TO RELATED APPLICATION

This application is a 35 USC 371 application of PCT/EP2008/062721 filed on Sep. 24, 2008.

BACKGROUND OF THE INVENTION

1. Field of the Invention

The invention relates to a solenoid valve.

2. Description of the Prior Art

A conventional solenoid valve, particularly for a hydraulic unit, which is used for instance in an anti-lock brake system (ABS) or a traction control system (TC system) or an electronic stability program system (ESP system), is shown in FIG. 1. As can be seen from FIG. 1, the conventional solenoid valve 1, which is embodied for instance as a regulating valve that is open when without current, includes a magnet assembly 2 for generating a magnetic flux, which in turn includes a housing jacket 2.1, a winding holder 2.2, a coil winding 2.3, and a cover disk 2.4; and a valve cartridge 5, which has a capsule 5.1, a valve insert 9 connected to the capsule via a sealing weld, an armature 6 with a tappet 7 having a closing element 7.1 with a main sealing element 7.2, and a restoring spring 8. The coil winding 2.3 wound onto the winding holder 2.2 of the magnet assembly 2 forms an electrical coil, which is triggerable via electrical terminals 2.5 and generates a magnetic flux. The valve insert 9 conducts the magnetic flux, introduced by the magnet assembly 2 via the cover disk 2.4, axially in the direction of the armature 6 via an air gap 3. By means of supplying the coil winding 2.3 with current via the electrical terminals 2.5 and by means of the magnetic flux thus generated, the armature 6 is moved against the valve insert 9, counter to the force of the restoring spring 8.

Moreover, the valve insert 9, which is calked to a fluid block, not shown, via a calking flange 9.1, receives the so-called valve body 10, which includes a main valve seat 10.1 into which the closing element 7.1, via a main sealing element 7.2 embodied as a sealing dome, plunges sealingly, in order to perform the sealing function of the solenoid valve 1. The valve body 10 is press-fitted into the valve insert 9, and the main valve seat 10.1 is disposed at the top of the valve body 10. The restoring spring 8 is braced axially on one side on a tappet shoulder 7.3 and on the other on a spring support 10.2 on the valve body 10 in the vicinity of the main valve seat 10.1. By means of this arrangement, the restoring spring 8, in the open valve state, experiences a flow 12 through it of fluid, as a result of which the adjusted spring force can vary.

It is furthermore known to provide an additional component as a spring support, on which the restoring spring 8 is braced, in order to dispose the restoring spring 8 outside the fluid flow 12. In such an embodiment, however, because of displacement of the valve body 10 and tappet 7, which tappet rests via the main sealing element 7.2 on the main valve seat 10.1 of the valve body 10, in the adjustment of the air gap 3 the installed length of the restoring spring 8 between the spring support of unchanged position and the displaced tappet shoulder 7.3, and thus the adjusted spring force, varies, necessitating a suitable adaptation of the position of the spring support to correct the spring force after the adjustment of the air gap.

As can also be seen from FIG. 1, the conventional solenoid valve 1 includes an eccentrically disposed check valve 4, which performs a directionally oriented flowthrough function, and a valve component embodied as a plastic insert, which forms the lower valve part 11 and serves to seal off from a surrounding fluid block, not shown, as well as for sealing off from the valve body 10 and for receiving an annular filter 13 and a flat filter 14.

In German Patent Disclosure DE 10 2005 044 672 A1, a solenoid valve is for instance described which includes a magnet assembly, a capsule, an armature and a valve insert, which valve insert conducts a magnetic flux, initiated by the magnet assembly, axially via an air gap in the direction of the armature. The capsule has a lower region which is thrust overlappingly onto the valve insert. The overlapping region of the capsule of the solenoid valve described is lengthened in the direction of a calking region, on which the capsule is calked with a valve bush with a fluid block. A sleeve with a sealing seat is also inserted into the capsule in such a way that the sealing seat is disposed outside the valve insert. A restoring spring for a tappet can be braced against the sleeve in the fluid flow region in the vicinity of the sealing seat, or it can be braced against the valve insert outside the fluid flow region.

ADVANTAGES AND SUMMARY OF THE INVENTION

The solenoid valve of the invention has the advantage over the prior art that a valve body is embodied as a hoodlike sleeve, whose open end is press-fitted into a valve insert and acts as a spring support for a restoring spring that is disposed outside a fluid flow that occurs between an open main valve seat and at least one radial outflow opening, in the valve body embodied as a hoodlike sleeve. Moreover, the main valve seat is disposed with a through opening on the inside on a hoodlike end of the valve body embodied as a sleeve. As a result of the embodiment according to the invention of the solenoid valve, the restoring spring, without an additional component as a spring support, is not located directly in the region of the solenoid valve through which there is a flow; that is, the restoring spring is located outside the fluid flow region, so that the spring force of the restoring spring is advantageously unaffected by the fluid flow. Moreover, by means of the embodiment according to the invention of the solenoid valve, the adjusted installed length of the restoring spring between a tappet shoulder and the spring support of the valve body is advantageously unchanged when, for adjusting an air gap between an armature and the valve insert, the valve body and the tappet, which rests on a main valve seat of the valve body via a main sealing element, are displaced jointly inside the valve insert. As a result, a reduction in process complexity and greater precision in valve adjustment can advantageously be attained.

It is especially advantageous that on the open end of the valve body embodied as a hoodlike sleeve, an annular groove, which is encompassing or partial, is embodied as a spring support. This additionally to the axial support of the restoring spring advantageously enables radial guidance of the restoring spring in the support region on the valve body. Alternatively, on the open end of the valve body embodied as a hoodlike sleeve, a collar, which is embodied as encompassing or partial, can be integrally formed on as a spring support. The integrally formed-on collar also, in addition to the axial support, advantageously enables the radial guidance of the restoring spring in the support region on the valve body.

In a feature of the solenoid valve of the invention, a guide element for radial guidance of the tappet, which are embodied as encompassing or partial, can be integrally formed onto the open end of the valve body embodied as a hoodlike sleeve. Thus the collar, which is integrally formed onto the open end of the valve body embodied as a hoodlike sleeve and which is intended for radially guiding and axially supporting the restoring spring, can for instance be embodied such that the integrally formed-on collar simultaneously acts as a guide element for the radial guidance of the tappet.

In a further feature of the solenoid valve of the invention, the valve body embodied as a hoodlike sleeve is press-fitted into the valve insert in such a way that the at least one radial outflow opening of the valve body is aligned with at least one corresponding radial outflow opening in the valve insert. The location, number and shape of the outflow openings of the valve body can advantageously be adapted to the outflow openings of the surrounding valve insert in order to prevent the outflow openings from being covered.

In an alternative feature, the valve insert can be embodied in shortened form, and the valve body embodied as a hoodlike sleeve is press-fitted into the valve insert in such a way that the at least one radial outflow opening is not covered by the valve insert. As a result, an assembly process of the valve body is advantageously facilitated, since the valve body no longer needs to be installed in such a way that it is oriented with and fits outflow openings of the valve insert.

In a further feature of the solenoid valve of the invention, the valve body for sealing off is pressed with the hoodlike end against a press-fitting region with a fluid block. This means that the valve body for metal sealing is pressed at one point between the fluid connections of the solenoid valve in the fluid block. As a result, the complexity of the valve cartridge can be reduced, and costs can be lowered. For further reducing the complexity of the solenoid valve components, the valve insert can be embodied as a one-piece slit sleeve, which is produced for instance by curling a sheet-metal strip.

Advantageous embodiments of the invention, described below, as well as the conventional exemplary embodiments described above for the sake of better comprehension, are shown in the drawings. In the drawings, identical reference numerals identify components and elements that perform the same or analogous functions.

BRIEF DESCRIPTION OF THE DRAWINGS

The invention will be described below in conjunction with the accompanying drawings, in which.

DESCRIPTION OF THE PREFERRED EMBODIMENTS

Figure 1:
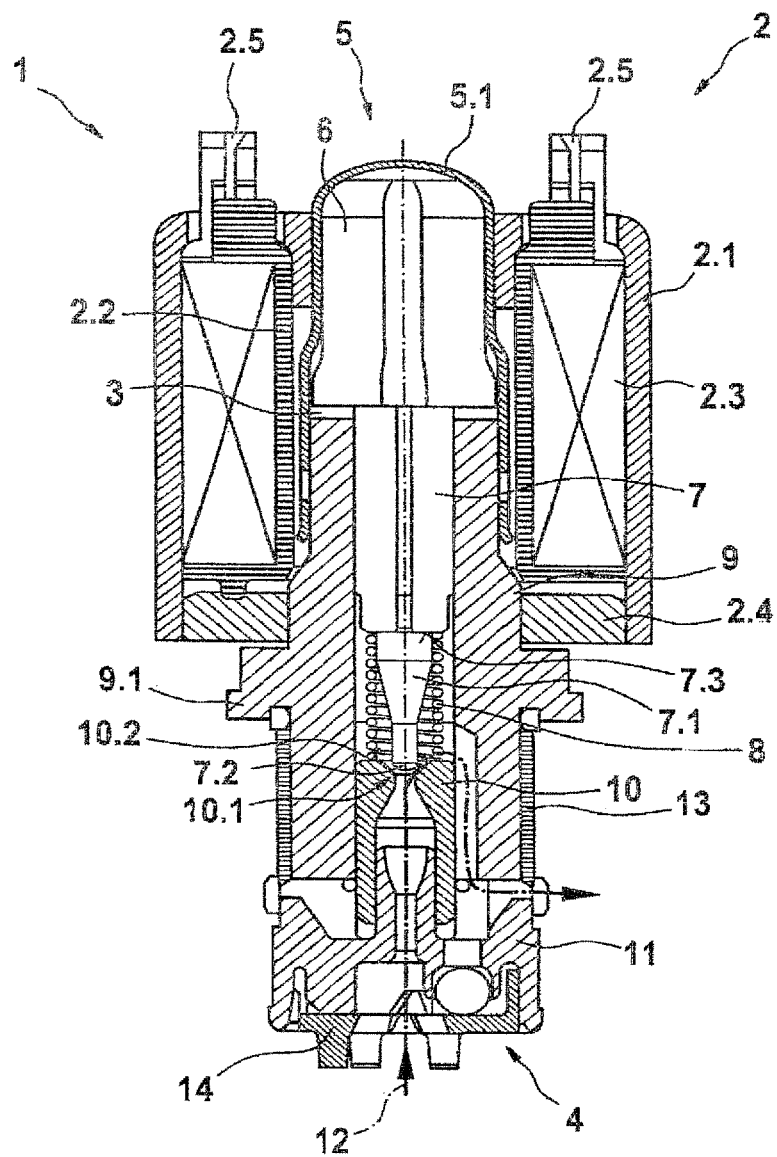
FIG. 1 shows a schematic sectional view of a conventional solenoid valve.
Figure 2:
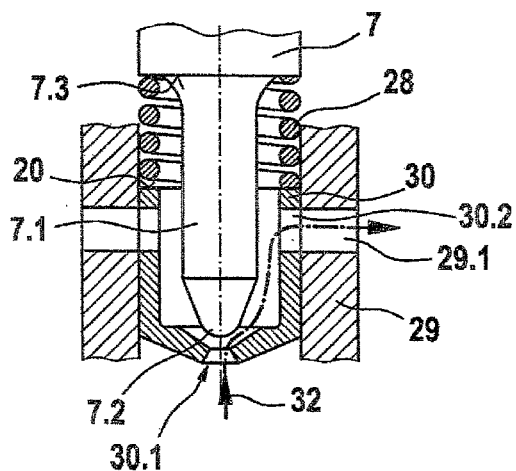
FIG. 2 shows a schematic sectional view of a first exemplary embodiment of a region essential to the invention of a solenoid valve according to the invention.
Figure 3:
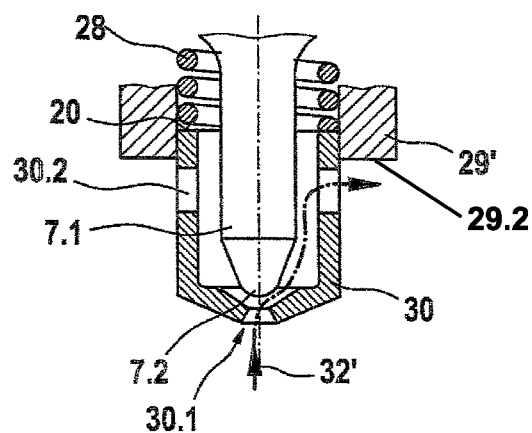
FIG. 3 shows a schematic sectional view of a second exemplary embodiment of a region essential to the invention of a solenoid valve according to the invention.
Figure 4:
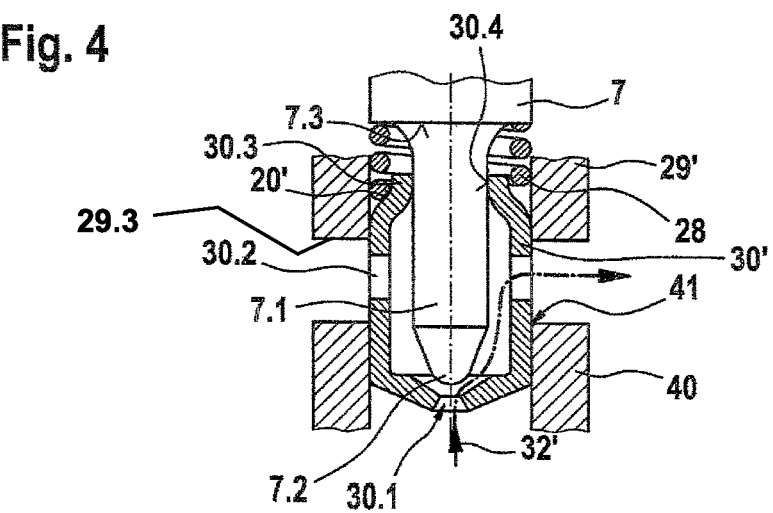
FIG. 4 shows a schematic sectional view of a third exemplary embodiment of a region essential to the invention of a solenoid valve.

As can be seen from FIGS. 2 through 4, a valve body 30, 30' of a solenoid valve of the invention is embodied as a hoodlike sleeve, whose open end is press-fitted into a valve insert 29, 29' and acts as a spring support 20, 20' for a restoring spring 28 that is disposed outside a fluid flow 32, 32' and on which a tappet 7 rests with a tappet shoulder 7.3. The fluid flow 32, 32' occurs for instance between an open main valve seat 30.1 and at least one radial outflow opening 30.2 in the valve body 30, 30' embodied as a hoodlike sleeve. As can also be seen from FIGS. 2 through 4, the main valve seat is disposed, with a through opening on the inside, on a hoodlike end of the valve body embodied as a hoodlike sleeve. Moreover, an armature, not shown, which is moved axially, counter to the force of the restoring spring 28, by a magnetic force generated by a magnet assembly, not shown, can move the tappet 7 with a first closing element 7.1 and a main sealing element 7.2 in such a way that the main sealing element 7.2 plunges sealingly into the main valve seat 30.1. The magnet assembly of the solenoid valve of the invention can be embodied analogously to the magnet assembly 2, shown in FIG. 1, of the conventional solenoid valve 1.

As can also be seen from FIG. 2, in a first exemplary embodiment of the invention, the valve body embodied as a hoodlike sleeve is press-fitted into the valve insert in such a way that the radial outflow openings of the valve body are aligned with corresponding radial outflow openings in the valve insert. The location, number and shape of the radial outflow openings 30.2 of the valve body 30 can advantageously be adapted to the outflow openings 29.1 of the surrounding valve insert 29 in order to prevent the radial outflow openings 30.2 of the valve body 30 from being covered.

As can also be seen from FIG. 3, in a second exemplary embodiment of the invention, the valve insert 29' is shortened to define a terminal end 29.2 that terminates valve insert 29' such that the valve insert 29' is embodied without radial outflow openings, and the valve body 30 embodied as a hoodlike sleeve is press-fitted into the shortened valve insert 29' in such a way that the radial outflow openings 30.2 of the valve body 30 are not covered by the shortened valve insert 29'. As a result, the process of press-fitting the valve body 30 is advantageously simplified, compared to the first exemplary embodiment of the invention, since it no longer has to be press-fitted into the valve insert 29' in a way that is oriented with and fits the radial outflow openings.

Figure 5:
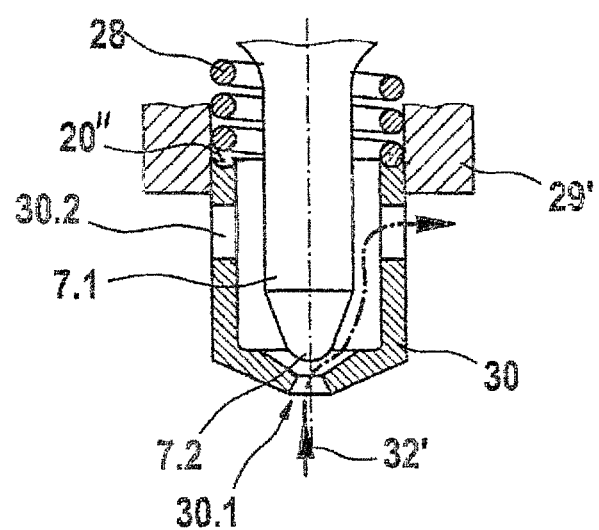
FIG. 5 shows a schematic sectional view of the second embodiment modified to have grooves 20" for supporting spring 28.

For radial guidance and axial support of the restoring spring 28, an annular groove 20" is shown in FIG. 5 on the open end of the valve body 30. The annular groove 20", for exemplary purposes, is shown on the second embodiment of FIG. 3, but is equally applicable to the first embodiment illustrated in FIG. 2.

As can also be seen from FIG. 4, in a third exemplary embodiment of the invention, analogously to the second exemplary embodiment of the invention in FIG. 3, the valve insert 29' is shortened to define a terminal end 29.3 that terminates valve insert 29' such that valve insert 29' is embodied without radial outflow openings, and the valve body 30' embodied as a hoodlike sleeve is press-fitted into the shortened valve insert 29' in such a way that the radial outflow openings 30.2 of the valve body 30' are not covered by the shortened valve insert 29'. In a distinction from the second exemplary embodiment of the invention, a collar 30.3 which is embodied as encompassing or partial is integrally formed as spring support 20' onto the open end of the valve body 30', embodied as a hoodlike sleeve, for radial guidance and axial support of the restoring spring 28. The collar 30.3 integrally formed onto the open end of the valve body 30', embodied as a hoodlike sleeve, for radial guidance and axial support of the restoring spring 28 is simultaneously embodied as guide means 30.4 for radial guidance of the tappet 37.

As can also be seen from FIG. 4, the valve body 30' of the second and third exemplary embodiments can, for metal sealing, be pressed with the hoodlike end against a press-fitting region 41 between the fluid connections of the solenoid valve with a fluid block 40. As a result, the complexity of the valve cartridge can be reduced and costs can be lowered.

For further reducing the complexity of the solenoid valve components, the valve insert 29, 29' can be embodied as a one-piece slit sleeve, which is produced for instance by curling a sheet-metal strip. The solenoid valve of the invention can be embodied for instance as a 2/2-way valve that is either open when without current or closed when without current.

The solenoid valve of the invention advantageously makes it possible to shift the restoring spring out of the fluid flow region into a region of the solenoid valve that does not have a flow through it, without using an additional component as a spring support. As a result, the spring force of the restoring spring is advantageously no longer affected by the fluid flow. Furthermore, because of the embodiment of the solenoid valve in accordance with the invention, the adjusted installation length of the restoring spring between a tappet shoulder and the spring support of the valve body is advantageously unchanged if, for adjusting an air gap between an armature and the valve insert, the valve body and the tappet, which via a main sealing element rests on a main valve seat of the valve body, are jointly displaced inside the valve insert. As a result, a reduction in process complexity and greater precision in valve adjustment can advantageously be achieved.

The foregoing relates to the preferred exemplary embodiments of the invention, it being understood that other variants and embodiments thereof are possible within the spirit and scope of the invention, the latter being defined by the appended claims.

The invention claimed is:

1. A solenoid valve, having a magnet assembly and a valve cartridge, which cartridge includes a capsule, a valve insert connected to said capsule, an armature that is disposed movably inside said capsule and that includes a tappet with a first closing element and a main sealing element, and a valve body with a main valve seat, which valve body is press-fitted into said valve insert, a restoring spring disposed between said armature and said valve body, wherein a magnetic force generated by said magnet assembly moves said armature axially counter to the force of said restoring spring, and said main sealing element plunges sealingly into said main valve seat, said valve body being embodied as a sleeve having an open first end press-fitted into said valve insert and an opposite end configured with a through axial opening surrounded by said main valve seat, said open first end abutting said restoring spring thereby acting as a spring support for said restoring spring, said valve body having at least one radial outflow opening, said main valve seat is disposed around said through axial opening on the inside of said valve body; wherein said spring support is disposed outside of a fluid flow path, wherein the fluid flow path is located between said axial opening and said at least one radial opening.

2. The solenoid valve as defined by claim 1, wherein a guide element for radial guidance of said tappet is integrally formed onto said open end of said valve body.

3. The solenoid valve as defined by claim 1, wherein said valve insert includes at least one corresponding radial outflow opening and said valve body embodied as said sleeve is press-fitted into said valve insert in such a way that said at least one radial outflow opening of said valve body is aligned with said at least one corresponding radial outflow opening in said valve insert.

4. The solenoid valve as defined by claim 1, wherein said valve insert includes a terminal end and said valve body embodied as said sleeve is press-fitted into said valve insert in such a way that said terminal end of said valve insert is disposed between said at least one radial outflow opening and said open first end of said valve body.

5. The solenoid valve as defined by claim 1, wherein for metal sealing, said valve body is press-fitted into a fluid block disposed between said at least one radial outflow opening and said opposite end of said valve body.

6. The solenoid valve as defined by claim 1, wherein said valve insert is embodied as a one-piece slit sleeve.

7. The solenoid valve as defined by claim 6, wherein said valve insert embodied as a one-piece slit sleeve is produced by curling a sheet-metal strip.

8. The solenoid valve as defined by claim 1, wherein a collar is formed on said open first end of said valve body defining said spring support for radial guidance and axial support of said restoring spring.

9. The solenoid valve as defined by claim 8, wherein said valve insert includes at least one corresponding radial outflow opening and said valve body embodied as said sleeve is press-fitted into said valve insert in such a way that said at least one radial outflow opening of said valve body is aligned with said at least one corresponding radial outflow opening in said valve insert.

10. The solenoid valve as defined by claim 8, wherein said valve insert includes a terminal end and said valve body embodied as said sleeve is press-fitted into said valve insert in such a way that said terminal end of said valve insert is disposed between said at least one radial outflow opening and said open first end of said valve body.

11. The solenoid valve as defined by claim 8, wherein a guide element for radial guidance of said tappet is integrally formed onto said open end of said valve body.

12. The solenoid valve as defined by claim 11, wherein said collar is integrally formed onto said open end of said valve body and is configured for radial guidance and axial support of said restoring spring and for simultaneously acting as said guide element for radial guidance of said tappet.

13. The solenoid valve as defined by claim 1, wherein an annular groove is formed on said open first end of said valve body defining said spring support for radial guidance and axial support of said restoring spring.

14. The solenoid valve as defined by claim 13, wherein a collar is formed on said open first end of said valve body defining said spring support for radial guidance and axial support of said restoring spring.

15. The solenoid valve as defined by claim 14, wherein said valve insert includes at least one corresponding radial outflow opening and said valve body embodied as said sleeve is press-fitted into said valve insert in such a way that said at least one radial outflow opening of said valve body is aligned with said at least one corresponding radial outflow opening in said valve insert.

16. The solenoid valve as defined by claim 14, wherein said valve insert includes a terminal end and said valve body embodied as said sleeve is press-fitted into said valve insert in such a way that said terminal end of said valve insert is disposed between said at least one radial outflow opening and said open first end of said valve body.

17. The solenoid valve as defined by claim 14, wherein a guide element for radial guidance of said tappet is integrally formed onto said open end of the valve body.

18. The solenoid valve as defined by claim 17, wherein said collar is integrally formed onto said open end of said valve body and is configured for radial guidance and axial support of said restoring spring and for simultaneously acting as said guide element for radial guidance of said tappet.

19. The solenoid valve as defined by claim 18, wherein for metal sealing, said valve body is press-fitted into a fluid block disposed between said at least one radial outflow opening and said opposite end of said valve body.

* * * * *